April 23, 1963  C. B. REECE  3,086,407

DAMPER POSITIONING MEANS

Filed July 25, 1961

INVENTOR
CLARK B. REECE
BY HIS ATTORNEYS
HARRIS, KIECH, RUSSELL & KERN

United States Patent Office 3,086,407
Patented Apr. 23, 1963

3,086,407
DAMPER POSITIONING MEANS
Clark B. Reece, Altadena, Calif., assignor to R.I.N.C.O., Los Angeles, Calif., a limited partnership
Filed July 25, 1961, Ser. No. 126,585
3 Claims. (Cl. 74—533)

This invention relates to an improved damper positioning means or damper regulator for controlling the flow of gas in a sheet metal duct or the like.

The damper regulator of the invention permits ready adjustment and easy locking of the damper regulator in any desired position. The improved damper regulator has a simplified design which is less expensive to manufacture and assemble.

The familiar damper regulator customarily used has a control shaft, sometimes described as a damper rod, which extends through the wall of the duct with the inner portion of the shaft within the duct carrying a butterfly valve or other suitable damper means. Provisions are made for adjustably locking the outer end of the control shaft to the duct. A typical prior design has a crank arm fixed to the control shaft exteriorly of the duct and means for fastening the crank arm to a plate or other extension of the device on the outer surface of the duct. On occasions the crank arm is wired in place. The damper regulator of the invention provides an improved manner of locking the damper in place. The improved design also facilitates repositioning of the damper with less effort than often required in the devices of the past. The device of the invention is compact and presents a neat appearance.

The damper regulator of the invention is designed especially for use with a gas-carrying duct having a damper means pivotally carried by a damper rod. The improved damper regulator comprises a body member adapted to be held to the duct which body member has a wall with an opening through which the damper rod may extend and be freely rotated. A second component of the improved damper regulator is an elongated spring steel locking member having a handle portion. The locking member also serves as a position indicator for the damper means. The spring steel locking member has a hole along its length adapted to receive the damper rod. When assembled, the locking member is held in tight rotatable engagement against the forward face of the body wall about the wall opening. Means is provided for holding the spring steel locking member to the body member. The locking member is freed of the holding means by a forward pulling and flexing of the handle and is returned to its locked position upon release of the handle portion by the resiliency of the spring steel. The damper regulator of the invention depends upon the inherent resiliency of the spring steel in moving the locking member in and out of locking engagement with the body member of the damper regulator. The locking member may be made of any construction material which possesses resiliency and exhibits the capability of recovering its shape after deformation. The term spring steel is used herein to include all such resilient construction materials. Spring steel having a thickness in the range of 0.020 to 0.040 inch is desirably used, although thicknesses somewhat outside the preceding range may be employed.

In a preferred embodiment of the damper regulator of the invention, the body member has a rearwardly facing recess which is defined by a raised recess wall about which there is placed a collar. When the damper regulator is placed in its operative position against the duct wall, the recess is adjacent the duct and the collar engages the duct wall. The recess wall has a central opening through which the damper rod may extend and be freely rotated. The wall is provided with a series of locking detents, preferably a series of slots placed outwardly of the central opening. The elongated spring steel locking member in this preferred embodiment, as before, has a hole along its length adapted to engage the damper rod and is provided with a rearwardly-turned locking tab adapted for seating in various ones of the locking slots of the body member. The locking member is repositioned by the grasping and forward pulling of the handle portion to unseat the tab from the locking slot in which it rests. When the handle portion of the spring steel locking member has been so flexed forwardly of the body member, the locking member may then be rotated to its desired new position. Upon release of the handle, the resiliency of the spring steel returns the handle and tab to another locking slot at the new position. The handle is desirably out of the plane of the locking member proper, being bent outwardly with a permanent set to increase the distance between the duct and handle, thus facilitating grasping of the handle.

Preferably, the locking tab does not fully seat in the locking slots. This arrangement causes the handle portion of the elongated locking member to be placed under some tension and elevated slightly out of engagement with the forward face of the body member wall. The spring steel locking member may be held in tight rotatable engagement with the forward face of the recess wall by rearwardly set and outwardly extending ears which ears slidably engage the rearward face of the wall about the central opening. The ears are set rearwardly of the locking member proper approximately the thickness of the recess wall.

Other advantages and objects of the invention will become more apparent to those skilled in the art from the following description of a preferred form of the invention, it being understood that other modifications and changes may be made.

Figure 1:
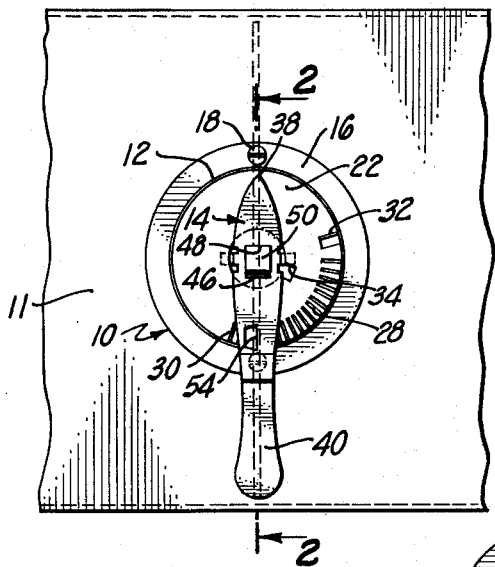
FIG. 1 is a front elevational view of a preferred embodiment of the damper regulator of the invention installed on the outer wall of a gas-carrying duct.
Figure 2:
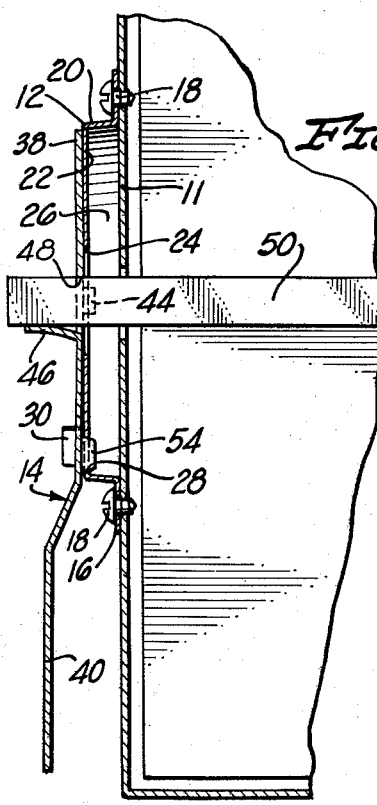
FIG. 2 is a sectional view taken along line 2—2 of FIG. 1 illustrating in further detail the damper regulator of the invention.
Figure 4:
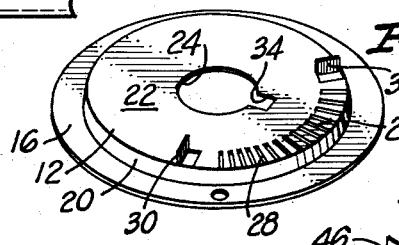
FIG. 4 is an isometric view of the damper regulator of the invention with its locking member removed, illustrating various features of the body member of the device.

With reference to FIGS. 1 and 2 in particular, there is illustrated a damper regulator device 10 installed on a wall 11 of a duct. The particular duct illustrated is not insulated but it will be understood that the device may be used with insulated ducts as well. The device 10 is made up of a pan-like circular body member 12 and a locking member 14 which latter member serves as a position indicator as well. The body member 12 has a circular collar 16 which is held to the wall of the air duct by two screws 18. The inner edge of the circular collar 16 (as best seen in FIG. 2) is turned outwardly to form a short tubular portion 20. The forward end of the short tubular portion 20 is closed by a wall 22 having a central opening 24 (see FIG. 4), which wall 22 is in a plane generally paralleling the plane of the collar. The short tubular portion 20 together with the wall 22 encloses a recess 26 (FIG. 2) which faces rearwardly towards the duct wall 11.

The circular recess wall 22 has around a portion of its outside perimeter a series of short, radially extending slots 28. The slot series occupies approximately 90° of the outer perimeter of the wall 22. Two forwardly extending stops 30 and 32 are formed on the outside perimeter of the circular recess wall by slitting the wall and lifting the slitted portions outwardly out of the plane of the wall. The distance on the perimeter of the circular wall between the stops 30 and 32 is approximately 130°. The central hole 24 of the circular recess wall has its outer edge broken to provide a notch 34, extending generally in the direction of the slots 28 and with the center line of the notch 34 being approximately 38° from the stop 32. It will be seen later that the correct positioning of the notch 34 with respect to the stops facilitates assembly of the damper regulator device. The combination locking member-position indicator 14 has an elongated shape and is made of flat spring steel being provided at one end with a point 38 and at the other end with a handle portion 40. The handle 40 in the preferred embodiment illustrated is not in the same plane as the locking member proper, being set outwardly of the duct wall to provide more space for the fingers to grasp the handle. The handle 40 may be in the same plane as the locking member proper but with less convenience. In the particular embodiment illustrated the means for holding the locking member 14 to the body member 12 comprises a pair of opposed, laterally extending ears 42 and 44 which are set rearwardly of the plane of the locking member proper. Intermediate the ears 42 and 44, the steel is slit (see FIG. 5) and a portion is lifted out of the plane of the locking member 14 to provide a tab 46 and a hole 48. The hole 48 is rectangular in cross section and sized to receive a damper rod 50 to which a butterfly valve (not illustrated) or the like is fixed. It will be appreciated that turning of the combination locking member-position indicator 14 turns the damper rod 50 and butterfly valve.

In the assembled device the tab 46 projects forwardly away from the duct and, as best seen in FIG. 2, the tab 46 is set at an angle to the damper rod 50, i.e., the tab 46 is not strictly perpendicular to the surface of the unstressed locking member 14 but is at a slight angle of a few degrees, preferably 3° from the perpendicular.

The two opposed ears 42 and 44, which are set rearwardly of the plane of the locking member 14 in the assembled device, engage the rearward face of the recess wall 22 about the central opening 24. The ears 42 and 44 in their assembled positions extend outwardly towards the perimeter of the recess wall 22 and serve to hold the locking member in tight rotatable engagement with the outer face of that wall.

Figure 5:
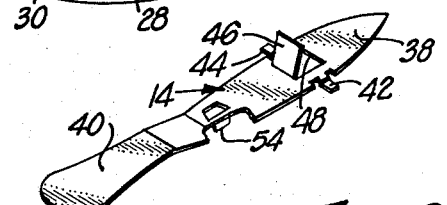
FIG. 5 is an isometric view, partially cut away, of the locking member.

The locking member 14 is provided with a second tab 54, upstruck from the locking member 14. The second tab 54 extends longitudinally of the length of the locking member 14 and in the opposite direction from the first tab 46 which extends transversely or widthwise of the locking member. The second tab 54 is formed in the handle portion 40 and in the assembled device faces rearwardly, seating in one or another of the several slots 28. As best seen in FIGS. 2 and 5, the opposite sides of the second tab 54 are purposely tapered. The unattached end of the second tab 54 has a length less than the length of the slots 28 but the attached end of the tab is considerably larger. Because of this arrangement, the tab 54 cannot fully seat in any of the slots 28, thus causing the handle portion 40 of the elongated locking member to be elevated slightly and out of engagement with the forward face of the rear wall (see FIG. 2), placing the handle portion under some tension. This arrangement assures that the tab 54 will remain in engagement with a slot 28 and reduces the likelihood of chatter between the locking member 14 and body member 12 upon vibration of the duct. The outwardly turned first tab 46, being slightly out of alignment with the damper rod 50, also assists in maintaining the spring steel handle portion 40 in a stressed condition and serves to avoid chattering between the damper rod 50 and regulator device 10.

Figure 3:
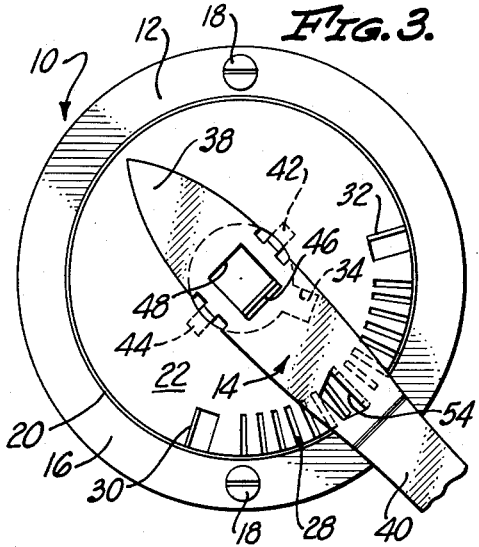
FIG. 3 is another elevational view on a somewhat larger scale, illustrating the damper regulator with its locking member in another position.
Figure 6:
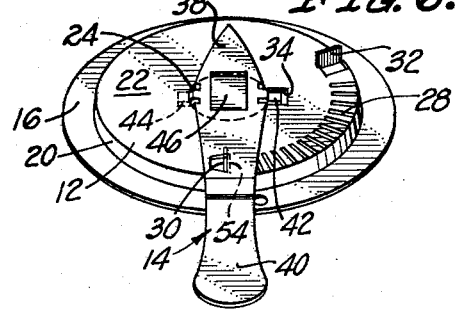
FIG. 6 is another isometric view illustrating the device in a partially assembled state.

The manner of assembling the damper regulator device 10 of the invention is best understood with reference to FIG. 6 where it is seen that the ear 44 of the locking member 14 has been placed through the central hole 24 into engagement with the rearward face of the recess wall 22. At this time the other ear 42 is situated in the notch 34 and the second tab 54 is in side-by-side relationship with the stop 30 of the body member. To complete assembly the handle portion 40 is grasped and sprung outwardly from the body member 12 and turned in a counterclockwise direction while retaining the ears 42 and 44 in their assembled positions. Upon release of the handle portion, the locking tab 54 can be made to engage one of the several slots 28 as illustrated in FIGS. 1 and 3.

Although an exemplary embodiment of the invention has been disclosed herein for purposes of illustration, it will be understood that various changes, modifications, and substitutions may be incorporated in such embodiment without departing from the spirit of the invention as defined by the claims which follow.

I claim:

1. A damper regulator for use with a gas-carrying duct having a damper means pivotally carried by a damper rod, said damper regulator comprising:

a body member adapted to be held to the gas-carrying duct and having a wall with an opening through which the damper rod may extend and freely rotate, said wall having a forward face facing away from the gas-carrying duct when said body member is held thereto and said wall being provided with a series of circumferentially arranged locking detents placed outwardly of the opening; and an elongated spring steel locking member including a handle portion, means for holding said locking member in tight sliding engagement with the forward face of the wall of the body member, said locking member having a damper rod receiving hole along its length adapted to engage the damper rod and a rearwardly-turned locking tab for cooperating with various ones of the locking detents to position said locking member with respect to the body member, said locking member being provided with a forwardly projecting tab immediately adjoining the damper rod receiving hole with the forwardly projecting tab being on the side of the hole closest to said locking tab and set at a slight angle to the axis of the rod receiving hole and inclined away from the locking tab, said locking member being repositioned by forward pulling of the handle portion thereof to disengage the tab from a locking detent, followed by turning of the locking member to a desired new position and release of the handle to permit return of the tab into engagement with another one of the locking detents at said position.

2. A damper regulator for use with a gas-carrying duct having a damper means pivotally carried by a damper rod, said damper regulator comprising:

a body member having a rearwardly facing recess defined by a raised recess wall surrounded by a collar, said recess being adapted to be placed adjacent the duct and said collar being adapted to engage the duct wall upon placement of the damper regulator in its operative position, said recess wall having a forward face facing away from the gas-carrying duct when said body member is held thereto and a central opening through which the damper rod may extend and freely rotate, said recess wall being provided with a series of circumferentially arranged locking slots placed outwardly of the central opening; and an elongated spring steel locking member including a handle portion, means for holding said locking member in tight, rotatable engagement with the forward face of the recess wall, said locking member having a damper rod receiving hole along its length adapted to engage the damper rod and a rearwardly-turned locking tab for seating in various ones of the locking slots of the body member, said locking member being provided with a forwardly projecting tab immediately adjoining the damper rod receiving hole with the forwardly projecting tab being on the side of the hole closest to said locking tab and set at a slight angle to the axis of the rod receiving hole and inclined away from the locking tab, said locking member being repositioned by forward pulling of the handle portion thereof to unseat the locking tab from a locking slot followed by turning of the locking member to a desired new position and release of the handle to permit return of the locking tab to another slot at said new position.

3. A damper regulator in accordance with claim 2 wherein the locking tab does not fully seat in the locking slots, thus causing the handle portion of the elongated locking member to be elevated slightly and out of engagement with the forward face of the recess wall.

References Cited in the file of this patent

UNITED STATES PATENTS

| | | |
|---|---|---|
| 1,569,113 | Blumlein | Jan. 12, 1926 |
| 2,129,505 | Rosenberg | Sept. 6, 1938 |
| 2,230,882 | Cameron | Feb. 4, 1941 |
| 2,919,601 | Cain | Jan. 5, 1960 |

FOREIGN PATENTS

| | | |
|---|---|---|
| 622,103 | France | May 24, 1927 |